June 27, 1961 C. F. WHITE 2,990,504
VARIABLE BANDWIDTH SERVOSYSTEM
Filed Sept. 10, 1958 3 Sheets-Sheet 1
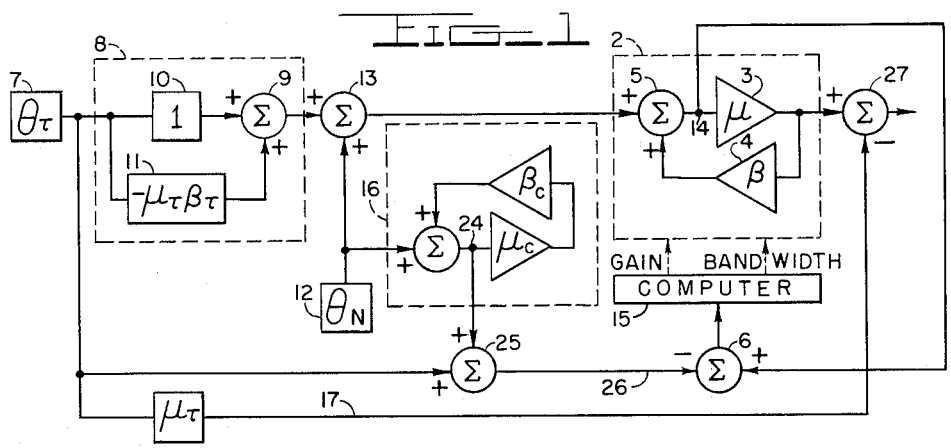
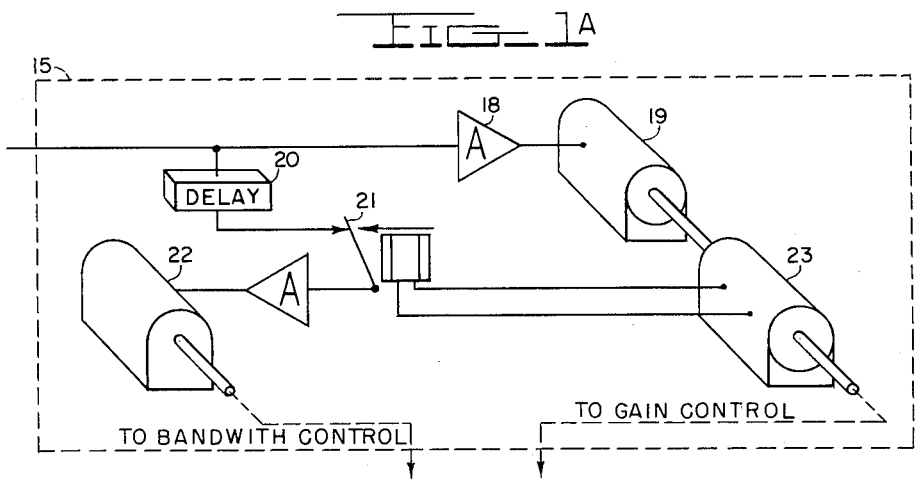
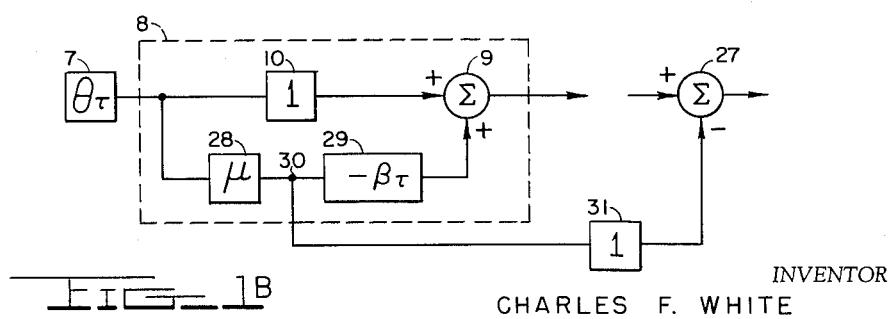
INVENTOR
CHARLES F. WHITE
BY Richard C. Reed
ATTORNEY June 27, 1961  C. F. WHITE  2,990,504
VARIABLE BANDWIDTH SERVOSYSTEM
Filed Sept. 10, 1958  3 Sheets-Sheet 2
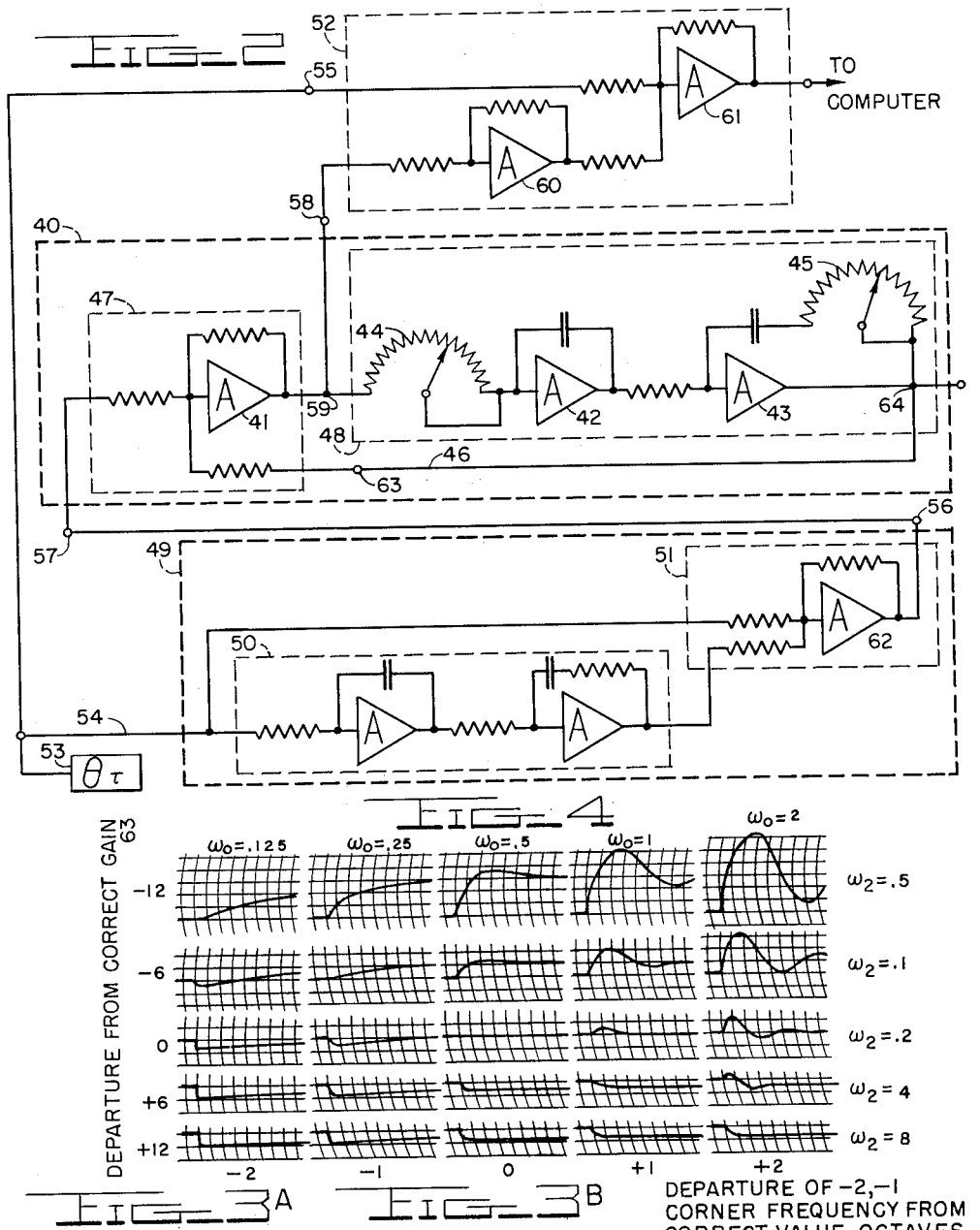
INVENTOR
CHARLES F. WHITE
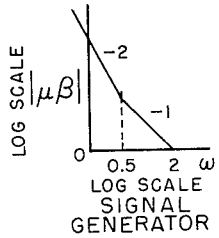
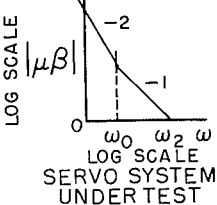
BY Richard C. Reed
ATTORNEY

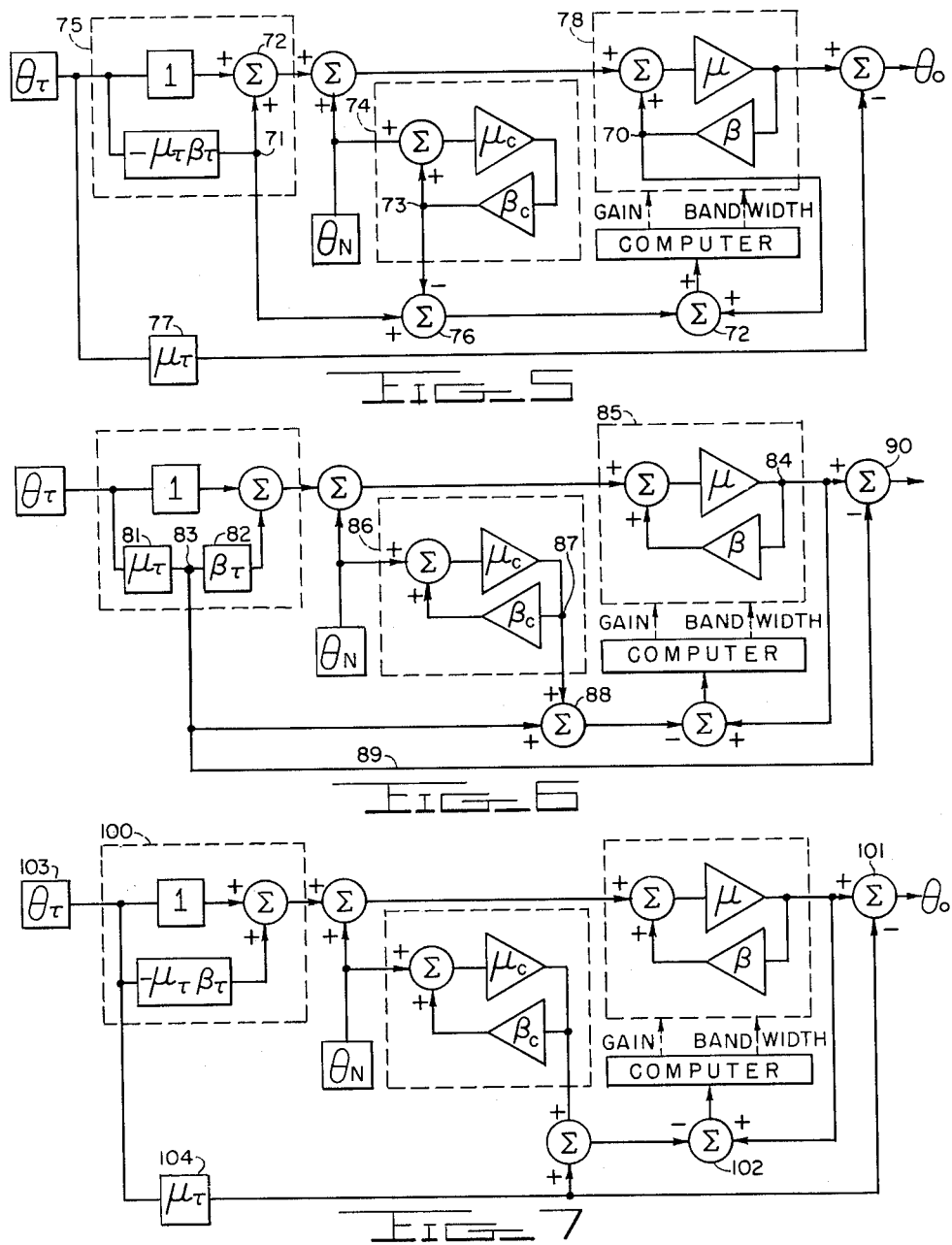

United States Patent Office 2,990,504
Patented June 27, 1961

2,990,504
VARIABLE BANDWIDTH SERVOSYSTEM
Charles F. White, 6024 Bock Road, Oxon Hill, Md.
Filed Sept. 10, 1958, Ser. No. 760,275
7 Claims. (Cl. 318—28)
(Granted under Title 35, U.S. Code (1952), sec. 266)

The invention described herein may be manufactured and used by or for the Government of the United States of America for governmental purposes without the payment of any royalties thereon or therefor.

The present invention is directed to an adaptive feedback system designed as an error closing closed-cycle system, hereafter referred to as an adaptive servo system, which contains means for automatically correcting drift in any of the components thereof due to environmental effects such as temperature, vibration, etc.

In applicant's copending application Serial No. 748,098, filed on or about July 11, 1958, a test apparatus for a servo system is described which may be used to compare the components of the servo system with a set of standard components which have the same output over input ratios or transfer functions as are desired for the components of the servo system. The present invention employs the principles and structure set forth in the above disclosure in a system which analyzes the results obtained from the comparison and automatically adjusts the components of the servo system to agree with the standard components.

In the past, attempts have been made to automatically control the gain of feedback systems of this type, but in general the control devices are used either to merely hold the gain constant or to correct the gain independent of frequency. In one case a frequency outside the normal operating band has been used for system gain control. Since modern servo systems depend on reliable complex gain vs. frequency characteristics, there is a need for measuring and controlling gain over the entire band of frequencies in which the servo system normally operates. In particular, the control structure of the present invention corrects the gain not only at the highest frequencies in the operating band, but also at the very low frequencies where prior art control devices have been relatively ineffective.

Therefore:
An object of the present invention is to provide an automatic control for comparing the transfer functions of the various portions of a servo system with the analogous transfer functions of portions of a standardized test signal multiplier and adjusting the former to agree with the latter to their proper value.

Another object of the invention is to provide means for testing and adjusting a servo-system in the manner described above wherein test signals and normal operating signals are applied simultaneously over the entire frequency range and compensating means are provided to separate the signal induced by each at selected output points in the servo loop.

These and other objects of the invention will be readily understood from the following specification and drawings wherein like numerals designate like elements.

In the drawings:

FIG. 1 shows an embodiment of the invention wherein the error signal of the servo system is used to automatically adjust the system;

FIG. 1a shows one embodiment of the computer in FIG. 1;

FIG. 1b shows an alternate embodiment of a portion of FIGS. 1 and 5;

FIG. 2 shows a more specific embodiment of the servo system, multiplier and monitor structure in FIG. 1;

FIGS. 3a and 3b show the design data for the structure in FIG. 2;

FIG. 4 shows a matrix of test results obtained using the structure of FIG. 2;

FIG. 5 shows a further embodiment of the invention, wherein the feedback signal is used to automatically adjust the system;

FIG. 6 shows a preferred embodiment of the invention, wherein the output signal of the servo system is used to automatcially adjust the system; and FIG. 7 shows another embodiment of the invention using the output signal of the servo system.

In applicant's copending application mentioned above an apparatus and method for testing a servo system is described, wherein a test signal is multiplied by $1-\mu_T\beta_T$, $\mu_T\beta_T$ being substantially equal to the open loop transfer function of the servo system, and the resultant signal applied to the input of the servo system. The error signal produced in the servo system is then compared with the original test signal. If the two are identical, the open loop transfer function, $\mu\beta$, of the servo system corresponds exactly to $\mu_T\beta_T$. The latter may, therefor, be used as a standard of known value either to measure $\mu\beta$, by varying $\mu_T\beta_T$ until the error signal becomes identical to the original signal, or to adjust $\mu\beta$ to its correct value by varying $\mu\beta$ to obtain the same result. The present disclosure is concerned with the latter problem, i.e., adjusting $\mu\beta$ to its proper value. The term "open loop transfer function" refers to the output over input ratio of the servo loop when it is opened, usually by disconnecting the feedback path from the input summing point. Since the input and feedback signals at this point are of the the same character, their ratio is a dimensionless loop gain factor, whereas the transfer functions $\mu$ and $\beta$, which are the output over input signal ratios of the forward and feedback paths, often are the ratio of two different, but reciprocal, functions of time.

In FIG. 1 is shown one embodiment of an adaptive servo system of the present invention. The portion of the servo system shown within the dashed block 2 includes a forward path 3 having a transfer function $\mu$, and a feedback path 4 having a transfer function $\beta$. The output of the forward path is connected to the input of the feedback path. The system input and the feedback output are connected to supply signals to the input of the forward path by means of a summing point 5, a device which combines signals from two sources while isolating the sources from one another. This general structure is found in any servo system of the prior art.

While the conventional servo-system is fed input control signals directly from a source 12 to input summing point 5, these input signals in the present invention are processed and combined with test signals by means of additional summing points. Output signals from the servo-system are combined with the test and input signals by means of further summing points and processing means to produce not only the normal output signal, but also an output to adjust the components of the servo-system for environmental changes and the like. The polarity markings at the summing point indicate the polarity of the signals combined and will vary according to the type of summing point employed. Summing point 5 is termed an adder since it combines the signals in phase. Another type of summing point is an error detector which combines signals in antiphase relationship, such as summing point 6 in FIG. 1. Examples of these summing points will be described in connection with FIG. 2 of the present disclosure.

A test signal is obtained from a source 7 in FIG. 1 and applied to a multiplier means 8. The multiplier means includes an adder 9 which combines signals from paths 10 and 11 connected to the source 7. Path 10 is a direct connection as indicated by the unity transfer function and path 11 contains means for multiplying the signal therein by $-\mu_T\beta_T$. The multiplied signal is then combined with the normal input signal source 12 by means of adder 13. An error detector 6 is connected to the input 14 of the forward path of the system 2 under control and to the output of signal source 7 through summing point 25 to combine the signals induced at these monitor points.

All of the above structure is discussed in detail in the aforementioned copending case; the remaining structure, however, is peculiar to the present invention. Whereas a simple detector or recorder was previously connected to the output of error detector 6, the present invention employs a computer 15. The function of the computer is to analyze the output of the error detector 6 and develope suitable output signals to adjust $\mu$ and $\beta$ to their proper value. FIG. 1 also includes portions 16 and 17 which compensate for the presence of the normal operating signal in the test monitor circuit and the presence of the test signal in the normal servo system output. These will be explained in more detail later. For the present the normal operating signal $\theta_n$ will be considered to be zero. The structure of the computer is best understood when applied to a specific servo system as shown in FIG. 2.

FIG. 2 shows a combined servo-system and testing structure which has been constructed on a standard analog computer and contains structures of the type designated broadly in FIG. 1. There being no $\theta_n$ present, portions of the compensating circuit including source 12, processing circuit 16, branch 17 and the summing points 13, 25 and 27 are not shown. These portions are merely duplicates of other portions of the circuitry disclosed in FIG. 2 and require no special structures. Computer 15 is disclosed in FIG. 1a and will be discussed later. The main servo system portion 2 in FIG. 1, which comprises the structure within dotted block 40 includes three standard high gain D.C. operational amplifiers 41, 42 and 43. In this exemplary embodiment each of the fixed resistors has a value of one megohm and the capacitors have a value of one microfarad. Variable resistor 44 has a mean value of one-half a megohm and variable resistor 45 has a mean value of two megohms. The portion within dotted block 40 which is bounded by dotted block 48 constitutes the forward path of the main servo system and the portion within dotted block 47 is the input summing point. The feedback path is a direct connection 46 which connects input 63 of summing point 47 to the output 64 of the servo system. The multiplier means 49, portion 8 of FIG. 1, consists of portions 50 and 51, which in this case are duplicates of the forward path and the summing point of the main servo system except that variable resistors 44 and 45 are replaced by fixed resistors having the mean values specified above. Since the feedback path in this case consists of a simple direct connection, this portion adds no structure to the multiplier.

Generally the main servo system will comprise more complicated structure, as for example, mechanical, hydraulic or pneumatic devices, and the multiplier above will consist of a simple analog means as shown here. A person skilled in the art will recognize that the variable resistors might, for example, represent hydraulic valves. The main servo system may provide electrical signals at the points therein to which the test apparatus is connected, or the test apparatus may employ converters to change electrical signals to mechanical form. Likewise, the test apparatus may be a mechanical rather than an electrical analog or a mixture of duplicate and analoged portions of the main servo system.

The portion 52 of FIG. 2, summing point 6 in FIG. 1, is the error detector or test monitor of the test apparatus. The various portions of FIG. 2 are connected in the manner indicated in FIG. 1, i.e., a test signal source 53 is connected to the input 54 of the multiplier 49 and simultaneously to one input 55 of the error detector 52. The output 56 of the multiplier is connected to the input 57 of the main servo system 40. The remaining input 58 of the error detector is connected to the forward path of the main servo system at point 59.

The adder 51 and the error detector 52 are both composed of high gain D.C. operational amplifiers 60, 61 and 62 and resistors of large equal values, for example one megohm. The error detector is merely an adder with a phase inverter connected in series with input 58. In this case the inverter consists of an amplifier 60 with an odd number of stages.

The desired open loop transfer function for the servo system 40 in FIG. 2 is described by the asymptotic segment representation in FIG. 3a. The exact values of components in multiplier 49 were derived in accordance with the FIG. 3a representation. The actual open loop transfer function of the servo system is described by the more general representation in FIG. 3b. When resistors 44 and 45 have the mean values previously described the corner frequency $\omega_0$ in FIG. 3b will correspond to the value of 0.5 radian/sec. given in FIG. 3a, and the bandwidth will be 2 radians/sec. As resistor 44 is varied, the gain reference level must be moved-up or down to indicate the proper gain at the corner frequency and the corresponding change in bandwidth $\omega_2$ of the system. As resistor 45 must be varied, the frequency scale is shifted to correspond to the new values of corner frequency and resultant bandwidth. Thus resistor 44 may be employed to alter both gain and bandwidth, while resistor 45 may be employed to alter bandwidth alone.

FIG. 4 shows a matrix of sample time base recordings of the output from the error detector in FIG. 2 using an input signal having a step function waveform. The recording at the center of the matrix was made with the main servo system adjusted to provide the specified open loop transfer function, i.e., the transfer function used in the multiplier. The recordings above and below this recording were made with the gain altered, as indicated, and the recordings to the left and right of center with the corner frequency altered, as indicated.

These recordings show that, if only the corner frequency or bandwidth is altered, the output of the error detector becomes zero a short time after the test signal is applied. When the gain is altered, however, the signal becomes a steady D.C. voltage with a magnitude proportional to the degree of alteration and a polarity indicative of the direction in which gain has been altered. If the gain is adjusted to its proper value, using this information, the magnitude and polarity of the signal from the error detector indicate the degree and direction, respectively, of correction required for the corner frequency. This information is converted to control signals by the computer in FIG. 1.

FIG. 1a shows one embodiment of the computer 15. The monitor signal from the error detector is passed through an amplifier 18 to boost the strength of the signal sufficiently to operate a first reversible motor 19. This motor is damped sufficiently to delay its response to the amplified monitor signal until the waveform reaches the relatively quiescent or steady state indicated in FIG. 4. This damping may be provided by choosing a motor which has fairly high values of inertia and/or friction. Thus, this first motor will not respond to monitor signals due to incorrect corner frequency or bandwidth alone, since the steady state signal becomes zero after a few system time constants (reciprocal radian bandwidths). If the monitor signal is at least partially due to incorrect gain the steady state condition will not be zero and the motor will rotate in a sense determined by the polarity of the steady state signal. By connecting the motor shaft to a gain control such as the variable resistor 44 in FIG. 2 the gain is automatically raised or lowered to its proper value.

The monitor signal is also applied through a time delay structure 20, a relay 21 and a second amplifier to a second reversible motor 22. This second motor has very little damping as compared to the first motor and therefor responds readily to the initial transients in the monitor signal caused by incorrect values of corner frequency. The shaft of the second motor is connected to a corner frequency or bandwidth control in the servo system, as for example, the variable resistor 45 in FIG. 2. Again depending on the polarity of the monitor signal, the corner frequency is raised or lowered to its proper value.

In order that the computer will operate more efficiently, a relay control 23 is mounted on the shaft of the first motor to open relay 21 when this shaft is rotating. The relay control 23 may be an A.C. generator, a centrifugal switch which connects an energizing source to the relay 21, or any other equivalent structure. The relay 21 may be a vacuum tube, a solenoid switch, or a clutch, to name a few examples. The relay 21 and control means 23 disable the bandwidth or corner frequency control when the gain of the servo system is being adjusted. By inserting a delay structure 20 between the output of the error detector 6 and the relay 21, the slower starting gain control is allowed to assume exclusive control of the system adjustment when any error in gain is involved. As can be seen in FIG. 4 the proper adjustment of the corner frequency is not always apparent until after the gain has been corrected. For example, a rise of one octave in corner frequency accompanied by a 6 db gain produces a negative monitor signal, while a one octave rise in corner frequency alone produces a positive monitor signal.

The system illustrated above has been chosen because of its simplicity and should not be interpreted as being indicative of the scope of applicant's invention. Much more elaborate systems can be easily devised by those skilled in the art for converting the error detector output signal to suitable signals for controlling the transfer characteristics of the servo system. More than two elements may be controlled, if desired. The computer need not employ motors, but may use any type of prime mover. The most desirable structure for use in Applicant's novel system will vary according to the particular servo system involved.

As a further refinement of this invention in order that the test signals will not be contaminated by the normal input signal from source 12, the compensating structure 16 shown in FIG. 1 is added to the system. This structure consists of a secondary servo system having substantially the same transfer functions as the main servo system 2. The input of the secondary servo system is connected to the source of normal input signal 12. The point 24 in the forward path of the second servo system is connected to one input of summing point 25. Since the remaining input of the summing point is connected to the source of test signals 7, the signal applied to input 26 of the error detector 6 is a combination of the original test signal and a signal equal to the normal error signal of the secondary servo system.

As a result of introducing this extra signal to the error detector the output monitor signal to the computer becomes $$\theta_m = \left(\frac{\mu\beta - \mu_T\beta_T}{1 - \mu\beta}\right)\theta_T + \left(\frac{\mu\beta - \mu_c\beta_c}{(1 - \mu\beta)(1 - \mu_c\beta_c)}\right)\theta_n$$

The first term of this equation represents the output from the error detector in the absence of normal input signal. The second term of the equation is due to the normal input signal and will be much smaller since $\mu_c\beta_c$ is nearly equal to $\mu\beta$ and the denominator represents a very large number at low-frequencies. The frequency band under test in FIG. 3a, for example, is substantially 2 radians/second. The effect of $\theta_n$ on the monitor signal is, therefore, virtually eliminated.

In order to prevent the test signals from contaminating the normal output signal from the servo system 2, the compensating signal path 17 is provided. This path has a transfer function $\mu_T$ equal to the transfer function of the forward path of the main servo system 2. This path is connected at its input end to the test signal source, and the output end is connected to the output of the main servo system 2 by means of an error detector 27.

FIG. 1b shows an alternate arrangement of a portion of FIG. 1. When the multiplier includes separate structures 28 and 29 for providing the forward and feedback transfer functions, a path 21 with unity transfer function, or a direct connection, may be used, provided the input end of the path is connected to point 30 between the two structures.

The output of servo system 2 with the compensating path 17 or 31 connected becomes $$\theta_0 = \left(\frac{\mu}{1-\mu\beta}\right)\theta_n + \frac{(\mu-\mu_T) + \mu\mu_T(\beta-\beta_T)}{1-\mu\beta}\theta_T$$

The first term of this equation is the normal output in the absence of any test signal. The second term is the contribution due to a test signal. This second term is always small compared to the first, since the difference between $\mu$ and $\mu_T$ is a small quantity compared to $\mu\beta$, and the difference between $\beta$ and $\beta_T$ is also very small compared to $\mu\beta$ even when multiplied by $\mu\mu_T$, within the frequency band under test.

An alternate arrangement for obtaining a monitor signal is shown in FIG. 5. In this case the feedback signal from monitor point 70 in the main servo system 78 is combined with a signal from monitor point 71 in the multiplier 75 by means of an adder type summing point 72. The compensating signal from the secondary servo system 74 is taken from point 73 in the feedback path and combined with the signal from the multiplier 75 by means of summing point 76. The path 77 is equivalent to path 17 in FIG. 1, and also may be merely a direct connection as shown in FIG. 1b when the $\mu_T$ and $\beta_T$ portions of the multiplier are separate structures.

Another embodiment of the present invention is shown in FIG. 6. This system requires that the portion of multiplier 100 which has a transfer function $\mu_T\beta_T$ be formed of separate portions 81 and 82 having transfer functions $\mu_T$ and $\beta_T$, respectively. A signal sampled from a monitor point 83 between the separate portions is combined with a signal from the output monitor point 84 of the main servo system 85 to produce the monitor signal. The compensating signal from the secondary servo system 86 is taken from the output of that system at point 87 and combined with signal taken from point 83 in the multiplier by means of summing point 88. The output signal at point 84 compensated by combining the signal at point 83 with the output signal using path 89 and error detector 90.

FIG. 7 shows a further embodiment of the invention. This arrangement is similar to FIG. 6 except that the $\mu_T$ and $-\beta_T$ portions of the multiplier 100 are combined. The compensating signal to the output summing point 101 and the signal from the test apparatus to the monitor point 102 are obtained by passing the test input signal from source 103 through a separate $\mu_T$ multiplier 104. As previously mentioned, there are cases where the $-\beta_T$ function is difficult to duplicate or analog by itself. The above embodiment provides a solution to this difficulty, and yet allows the use of the output signal which is generally more accessible than the feedback signal and less likely to be disturbed by monitoring than the error signal.

The particular adaptive system of those described above which might best be employed depends on the nature of the main servo system. Such factors as accessibility to points in the servo loop and the type of signal induced at these points, i.e., simple, complex, mechanical, etc., obviously will influence the decision of the employer. Since the components added to the main servo system which determine the accuracy of the transfer functions obviously are not required to supply power to sizeable loads, as is usually the case with the components of the main servo system, the components added may be considerably simpler in structure and provide ideal transfer functions unaffected by or easily protected from environmental changes. This coupled with the fact that analogs may be substituted, as desired, permits constructions of the present invention which are inexpensive, compact, lightweight and reliable.

It is understood that this invention is not to be restricted to the various embodiments of the invention which have been particularly described herein and that the invention is only to be limited by the scope of the claims appended hereto.

What is claimed is:

1. An adaptive servo system comprising: a first input, an output, a forward path connecting said first input and output having a transfer function $\mu$, a feedback path connecting said output and first input having a transfer function $\beta$, wherein the product of $\mu$ and $\beta$ is variable over a given range of values, said forward and feedback paths defining a first loop path, a source of test signal, multiplier means for multiplying said test signal by $1-\mu_T\beta_T$, connecting means for applying the signal so multiplied to said first input of said loop path, the function $\mu_T\beta_T$ being equal to a single preselected value of $\mu\beta$ within said given range whereby at least one signal is induced at a first monitor point in said loop path which is substantially equal to a signal at a second monitor point in said multiplier means when $\mu$ and $\beta$ are respectively equal to $\mu_T$ and $\beta_T$, a monitor summing point having a separate input connected to each of said first and second monitor points and having an output containing a monitor signal equal to the difference between the signals at said first and second monitor points, computer means connected to the output of said monitor summing point for generating at least one control signal in response to said monitor signal, control means in at least one portion of said loop path and connecting means linking said control means to said computer means for varying the open loop transfer function of said path in response to said control signal.

2. The system according to claim 1 wherein said control means comprises separate means for controlling the gain and bandwidth of said loop path, and said computer means comprises a first means for generating a control signal proportional to the difference in bandwidth of the signals from said first and second monitor points, and a second means for generating a control signal proportional to the difference in gain of the signals from said first and second monitor points.

3. The system according to claim 1 wherein the source of test signal is connected to the output of the loop path by means of an additional compensating path having a transfer function equal to $-\mu_T$.

4. The system according to claim 1 wherein said loop path contains a second input isolated from said first input, said second input being connected to a normal source of input signals, a secondary loop path having substantially the same open loop transfer function as said first loop path, compensating means for extracting a compensating signal from said secondary loop path at a point which corresponds to said first monitor point in said first loop path, and means for applying said compensating signal to the input of said monitor summing point which is connected to said first monitor point.

5. A compensated test apparatus for a servo system having at least a first loop path with an open loop transfer function $\mu\beta$ comprising, a first adder type summing point having an output connected to the input of said loop path and having first and second isolated inputs, a source of test signals, means to multiply said test signals by $1-\mu_T\beta_T$ connected between said source and said first input, $\mu_T\beta_T$ being substantially equal to $\mu\beta$, a second loop path having a transfer function $\mu_T\beta_T$ and having an input connected to said second input of said first summing point, a second summing point having a different input connected to a corresponding point in each said first and second loop paths to combine the signals induced at said corresponding points, and mointor means for comparing the output of said second summing point with a similar signal inducted in said multiplier means.

6. The apparatus according to claim 5 wherein an additional compensating path is connected between said source of test signals and the output of said first loop path, said additional path having a transfer function of $-\mu_T$, where $\mu_T$ is substantially equal to $\mu$.

7. An adaptive servo system comprising, a servo system having an open loop transfer function $\mu\beta$, a source of test signal, means to multiply said test signal by $1-\mu_T\beta_T$ where $\mu_T\beta_T$ is substantially equal to $\mu\beta$, means to apply the multiplied test signal to the input of said servo system, mointor means to combine in antiphase relationship the error signal induced in said servo system with test signal from said source, said monitor means having an output containing a monitor signal equal to the difference between said error signal and said test signals, first and second control means located in said servo system for controlling the gain and bandwidth, respectively, of said servo system, a prime mover connected to each of said first and second control means, each of said prime movers having a control signal input connected to the output of said monitor means, said prime movers and said control means being constructed and arranged to vary the gain and bandwidth of said servo system in response to the sense and amplitude of said control signal, said first prime mover having an operating characteristic such that it responds more slowly to changes in said control signal than said second prime mover, and disabling means responsive to variations of said first control means for disabling said second primer mover.

References Cited in the file of this patent

UNITED STATES PATENTS 2,940,026     Raque     June 7, 1960

OTHER REFERENCES

Terman, F. E.: Electronic and Radio Engineering, pp. 182, 374, 375, McGraw-Hill, N.Y., 1955.

Savant, C. J.: Basic Feedback Control System Design, pp. XV and XVI; McGraw-Hill, N.Y., 1958.